United States Patent [19]
Arnott

[11] Patent Number: 5,521,659
[45] Date of Patent: May 28, 1996

[54] REAR PROJECTION DISPLAY APPARATUS

[75] Inventor: John Arnott, Toronto, Canada

[73] Assignee: Input Technologies Inc., Toronto, Canada

[21] Appl. No.: 511,340

[22] Filed: Aug. 4, 1995

[51] Int. Cl.⁶ .................................................. G03B 21/00
[52] U.S. Cl. ............................... 353/119; 353/74; 353/77
[58] Field of Search ................................. 353/74, 76, 77, 353/78, 72, 73, 119, 99, 122; 345/180, 181, 182, 183; 348/787, 788, 794, 836, 839

[56] References Cited

U.S. PATENT DOCUMENTS

| | | | |
|---|---|---|---|
| 2,181,133 | 11/1939 | Katz . | |
| 2,543,561 | 2/1951 | Tracy . | |
| 3,560,088 | 2/1971 | Schwartz | 353/119 |
| 3,741,624 | 6/1973 | Kuntz | 353/78 |
| 3,848,980 | 11/1974 | Plummer | 353/76 |
| 4,764,885 | 8/1988 | Greanias et al. | 364/571 |
| 4,827,410 | 5/1989 | Corren | 364/200 |
| 4,846,694 | 7/1989 | Erhardt | 345/182 |
| 4,873,398 | 10/1989 | Hubby, Jr. . | |
| 5,033,843 | 7/1991 | Kolff | 353/122 |
| 5,090,800 | 2/1992 | Ushiro | 353/74 |
| 5,200,853 | 4/1993 | Berkman | 359/443 |
| 5,408,283 | 4/1995 | Lee | 353/77 |

Primary Examiner—William C. Dowling
Attorney, Agent, or Firm—Bereskin & Parr

[57] ABSTRACT

A rear projection display apparatus for displaying an image reduces parallax error. The display apparatus includes a housing, a transparent screen support having top and bottom surfaces, a translucent display screen removably adherable to the top surface of the screen support, and a projector to project the image onto the display screen. Optionally, a series of mirrors may be provided to sequentially reflect the image from the projector onto the display screen. In a preferred embodiment, the housing is pivotally mounted on a base, and houses the display screen, screen support, mirrors and projector.

28 Claims, 6 Drawing Sheets

REAR PROJECTION DISPLAY APPARATUS

FIELD OF THE INVENTION

This invention relates to a rear projection display apparatus, and in particular, a large screen user interactive rear projection display apparatus.

BACKGROUND OF THE INVENTION

It is common to have interactive writing surfaces (eg. a digitizing tablet) on which an user may write, with the image being displayed on a separate monitor or screen. These devices are very accurate in terms of registering and displaying what is drawn on the writing surface. However, they can be very inconvenient and awkward to use, as the user can not simultaneously look where he is drawing and at the screen to view what is being drawn.

Consequently, computerized work stations have been developed which allow the user to interact directly with the screen on which the image is displayed. Typically, the user utilizes a photoelectric device for communicating with a computer through movement over a screen, known as a light pen, to draw directly on the screen on which the image is displayed. The computer registers the movement of the light pen over the screen, and projects the corresponding image directly onto the screen.

The screen on which the image is projected is usually made from clear glass, which does not show an image, so many rear projection screens have a fresnel lens or lenticular lens to improve brightness and display the image. The images are projected onto the surface of the screen closest to the projector, and not on the surface closest to the viewer. This creates parallax problems when trying to write on the screen, as the user does not see the image exactly where it is projected.

In addition, such screens are usually curved, and are difficult to write on. A lenticular lens or screen also tends to be too rough to write on, so it is often accompanied by a thin writing surface on top of the screen, which compounds the parallax problem.

SUMMARY OF THE INVENTION

In accordance with one aspect of the present invention, there is provided a rear projection display apparatus for displaying images drawn by a user with an interactive writing device such as a light pen, comprising a housing having a working area, projection means mounted in the housing for receiving signals correlatable with the position of the writing device and projecting and focusing images in a predetermined focal plane, and support means mounted in the housing for supporting the working area during the use of the interactive writing device. The support means comprises a transparent screen support which has top and bottom surfaces. A translucent display screen is removably adhereable to the top surface of the screen support to diffuse and display images projected from the projection means. The thickness of the display screen is selected so as to reduce parallax error.

In a preferred embodiment, the display screen is removably adhered to the screen support by use of a spray adhesive, and is made from mylar of a thickness of 0.003 inches.

The housing utilized in accordance with the present invention may be pivotally mounted to a base, in order to allow the user to select a viewing angle which is appropriate for the individual. The pivoting may be controlled manually, or may be controlled by a motor.

In order to maximize the display screen within any given size of housing, the projection means may comprise a projector and reflection means for reflecting the image from the projector onto the display screen. The reflection means is adapted to reduce the linear distance between the projector and the display screen without decreasing the size of the display screen and without altering the focal length of the projector. The reflection means may comprise a series of mirrors, arranged to sequentially reflect the image projected from the projector onto the display screen.

BRIEF DESCRIPTION OF THE DRAWINGS

The advantages and utilities of the apparatus of the present invention will be more fully understood with reference to the following description and drawings wherein.

DESCRIPTION OF THE PREFERRED EMBODIMENT

Figure 1:
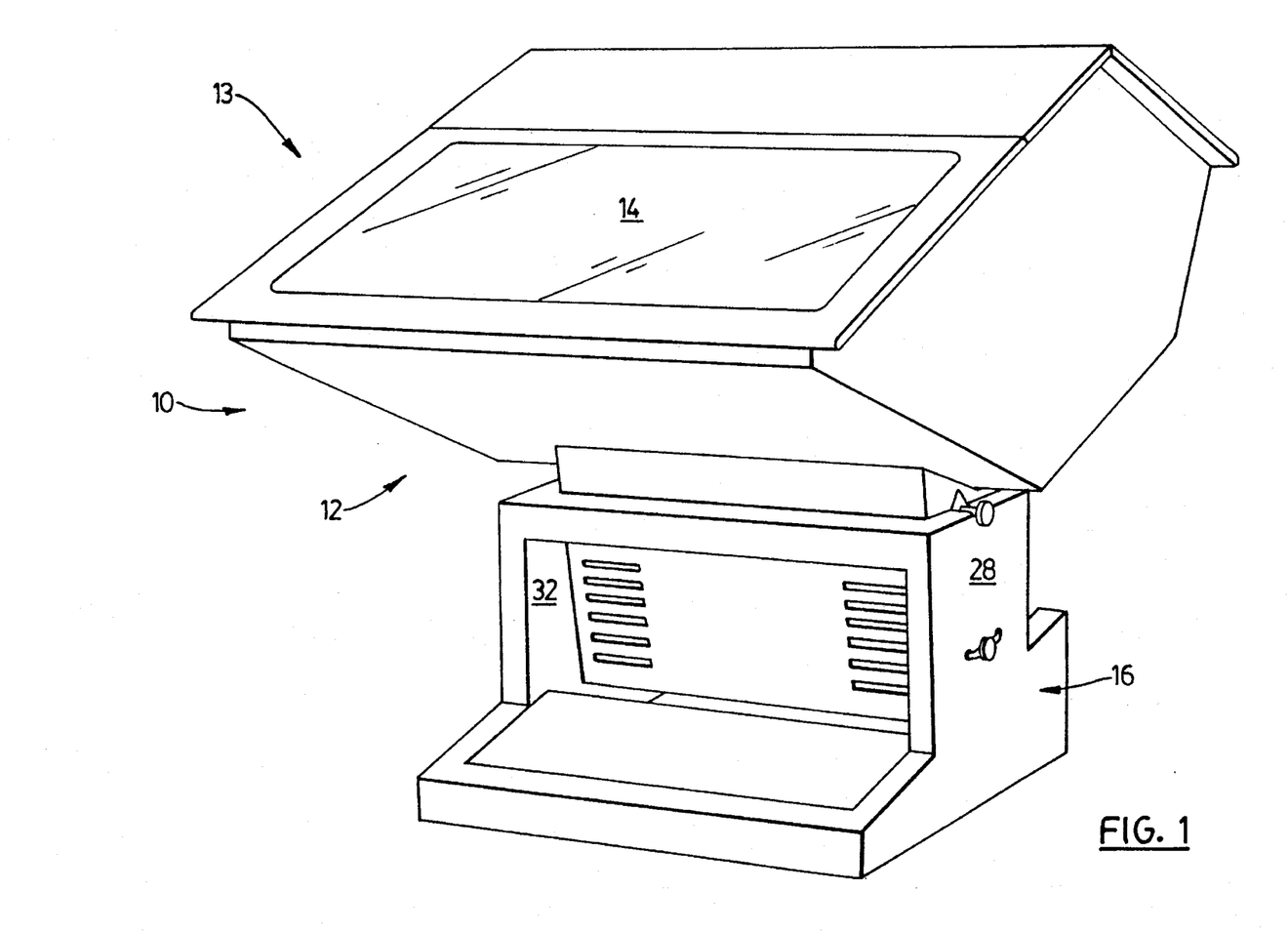
FIG. 1 is a perspective view of a preferred embodiment of a display apparatus made in accordance with the subject invention.

Referring to FIG. 1, shown therein is a preferred embodiment of a rear projection display apparatus made in accordance with the present invention, indicated generally as 10. Display apparatus 10 comprises a projection housing 12 having a working area 13, pivotally mounted on base 16. Writing and display screen 14 (hereinafter referred to as "display screen") is located in working area 13. Preferably, display apparatus 10 is of a size and shape which a user may comfortably stand or sit in front of during use.

Figure 2:
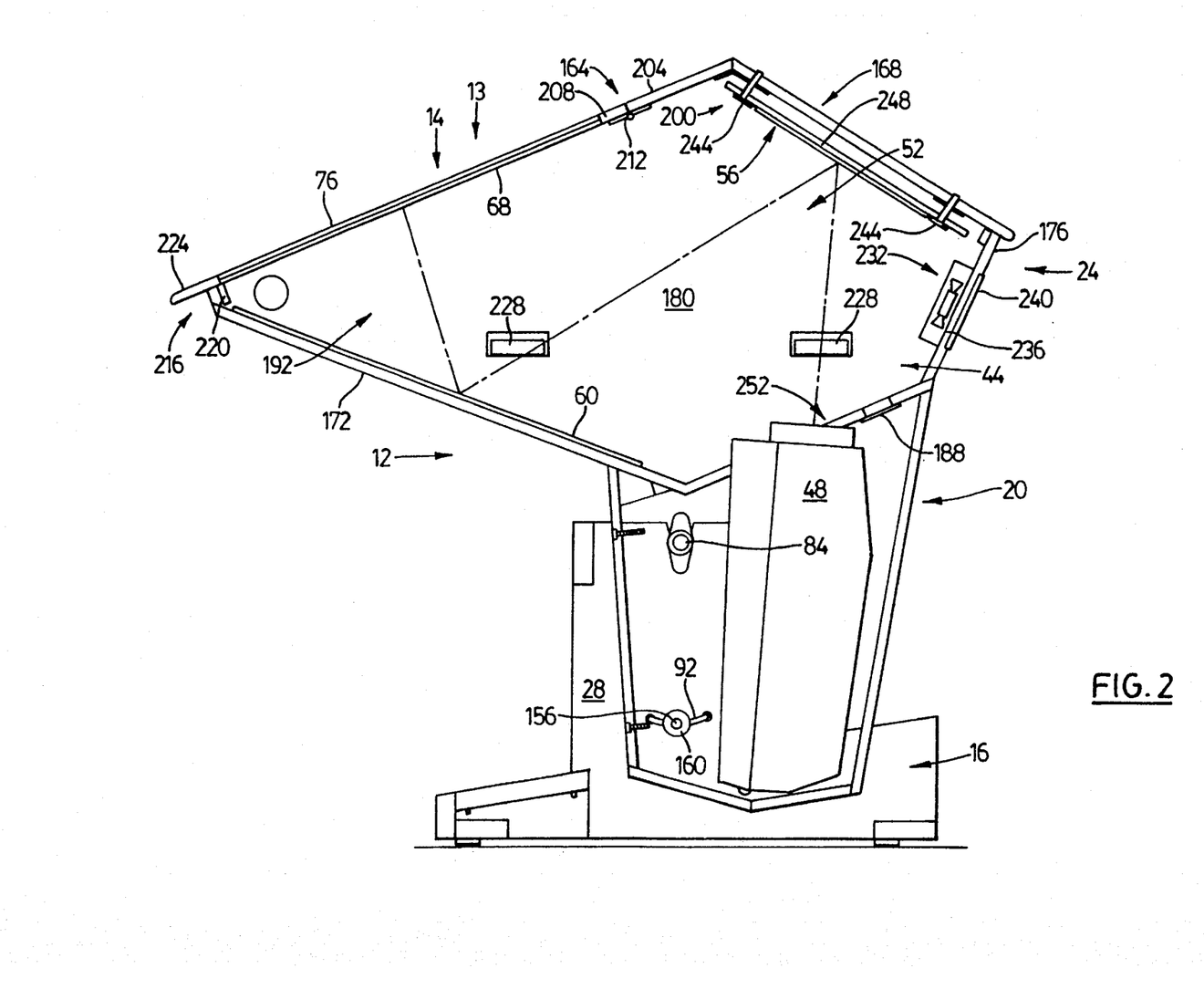
FIG. 2 is a side plan view of the display apparatus, with one side removed.

Referring now to FIG. 2, housing 12 may comprise a single unit, or two or more units which are releasably attachable to each other. In the preferred embodiment, housing 12 comprises a bottom portion 20 and top portion 24.

Base 16 may generally be of any shape or design which will pivotally support housing 12. Preferably, base 16 is generally of an inverted T shape, and has side walls 28 and a front wall (not shown) which when assembled together form an interior. The interior is of a size and shape to accommodate at least a portion of housing 12.

Projection means 44 is located within housing 12, and comprises projector 48, and reflection means 52. Projection means 44 is provided to project an image onto display screen 14. Projector 48 may be a three colour rear projector, such as an Electrohome model 4100 rear projection projector.

Reflection means 52 is provided to shorten the linear distance between projector 48 and display screen 14, without decreasing the size of the displayed images or having a special wide angle lens. Reflection means 52 may comprise one or more mirrors, aligned so as to reflect the projected image from projector 48 onto display screen 14. In this manner, the path which an image takes while travelling from projector 48 to display screen 14 is folded. By this design, a larger image may be viewed on display screen 14 than would otherwise be possible for any given size of the overall apparatus.

In the preferred embodiment as shown in FIG. 2, reflection means 52 comprises two mirrors 56 and 60. Mirror 56 is the mirror which images projected from projector 48 first contact, and are reflected onto mirror 60. Subsequently, the images are reflected from mirror 60 onto display screen 14. Mirror 56 may have a smaller reflecting area than mirror 60, as it is closer to projector 48.

Figure 3:
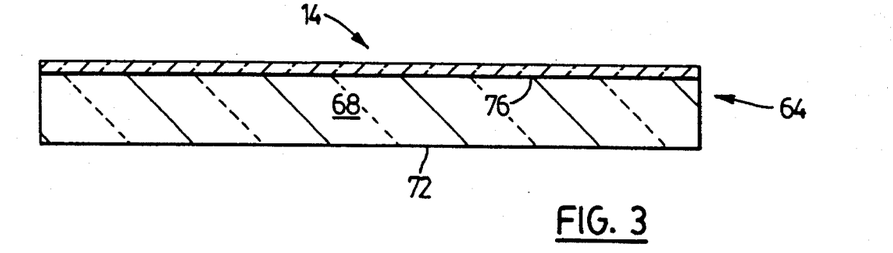
FIG. 3 is a cross-sectional view of the writing and display screen of the subject invention.

Referring now to FIG. 3, display screen 14 is supported in housing 12 by support means 64. Support means 64 may comprise screen support 68, which has a bottom surface 72 and a top surface 76 opposite thereto. Bottom surface 72 is the surface which light emitted from projector 48 first contacts when passing through screen support 68, and top surface 76 is the surface which light emitted from projector 48 last contacts when passing through screen support 68.

Screen support 68 is preferably flat and transparent. Screen support 68 is transparent such that light emitted from projector 48 is transmitted through it, and is not reflected from or displayed on either bottom surface 72 or top surface 76 of screen support 68. Preferably, screen support 68 is made of a material and is of a thickness such that it is strong enough to support display screen 14 and will withstand pressure applied to it when a user draws on it with a light pen or pressure sensitive pen. In a preferred embodiment, screen support 68 is made of transparent glass which is about 0.25 inches in thickness.

Display screen 14 is located on top surface 76 of screen support 68. Display screen 14 may be made from any material which is translucent in nature, such that it will display images projected from projector 48, subsequent to it passing through screen support 68. Preferably, display screen 14 is made of a thin translucent material which diffuses and displays images emitted from projector 48, such as Mylar™ which is resistant to damage and wear. The thickness of display screen 14 is preferably 0.002 to 0.005 inches. In a preferred embodiment, display screen 14 is made of Mylar™ of a thickness of about 0.003 inches.

Display screen 14 may be releasably adhered to top surface 76 of screen support 68. This may be accomplished in any known manner, for example with double sided tape, clamps or by use of a spray adhesive. In a preferred embodiment, display screen 14 is adhered to top surface 76 of screen support 68 with an adhesive spray. The spray adhesive may be any type which allows display screen 14 to be removed and replaced when it becomes worn or damaged. In the preferred embodiment, 3M Super 77™ pressure sensitive spray adhesive is used to adhere display screen 14 to top surface 76. The spray adhesive may be applied over the entire top surface 76 of screen support 68. Alternatively, the spray adhesive may be applied only to the four edges of top surface 76 of screen support 68, or in a checker board type pattern over top surface 76. In the preferred embodiment the spray adhesive is applied only along the perimeter of top surface 76 of screen support 68. In this manner, the spray adhesive will not affect the optics of the display apparatus. In this manner, it is unlikely that display screen 14 will become dislodged from top surface 76 of screen support 68, or damaged, when used in conjunction with a light pen.

Although display screen 14 may be removed and replaced when it becomes worn or damaged, the frequency with which this must be done is minimal, since the devices normally used to interact with the display screen 14, namely light pens and pressure sensitive pens, will not scratch or damage a material such as Mylar™.

There are two advantages to display screen 14. First, the image projected from projector 48 is focused on display screen 14, and not the underlying screen support 68. Because display screen 14 is made from a very thin material, parallax error is virtually eliminated, compared with images projected onto a standard rear projection screen. This is particularly important for applications utilizing computer graphics design programs and the like, as it is critical in these applications that parallax error be eliminated. When parallax error is present, the location which the user indicates on the writing surface of the screen will not correspond to the location which the screen registers or the location of the displayed image. Thus, the application will be very awkward to use and will have limited usefulness. By focusing the projected image onto the thin display screen 14 instead of onto screen support 68, this parallax problem is almost completely overcome.

The second advantage of display screen 14 is that it is removable and replaceable on screen support 68, so it may be replaced if and when it becomes damaged or worn.

It must be remembered that in order for display screen 14 to work properly in accordance with the present invention, the focal length of projector 48 must be such that images are focused on display screen 14 and not the underlying screen support 68.

Figure 4:
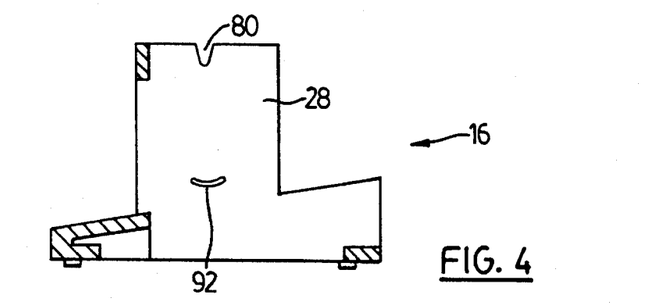
FIG. 4 is a side plan view of a base used in conjunction with the present invention.
Figure 5:
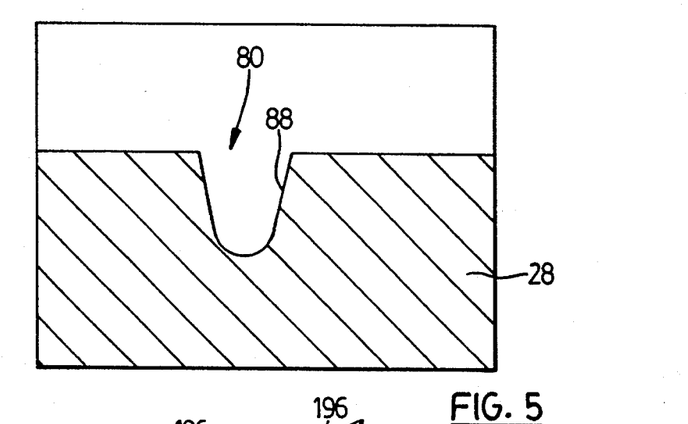
FIG. 5 is a side plan view showing a pivot saddle used in conjunction with the present invention.
Figure 8:
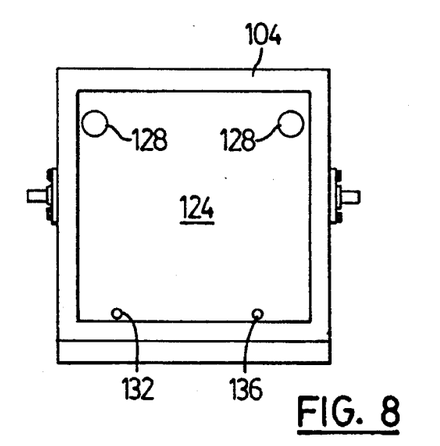
FIG. 8 is a rear plan view of the bottom cabinet of the housing.

Referring now to FIGS. 4 and 5, preferably, side walls 28 of base 16 are mirror images of each other, and each has a pivot saddle 80 located centrally and extending downwardly from its top. Pivot saddle 80 is generally a U-shaped cut out of the respective side wall 28, although it may be any suitable shape to support a pivot pin 84, located on housing 12 (as seen in FIG. 8). Pivot saddle 80 may by lined with a rubber or sponge tape 88 in order to protect it. In one embodiment, pivot saddle 80 is lined with 1/16 inch Thortape™, which is held in place with a glue adhesive.

Figure 7:
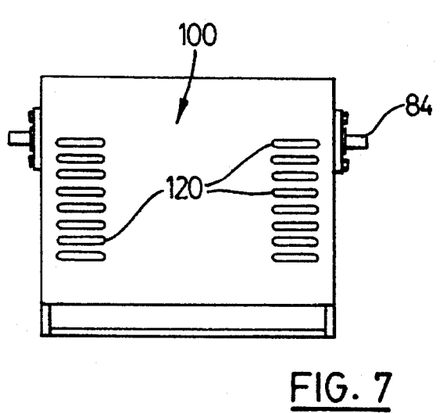
FIG. 7 is a front plan view of the bottom cabinet of the housing.

Further, each side wall 28 has a slot 92. Slot 92 is adapted to receive angle locking means 96 located on bottom portion 20 of housing 12 (as seen in FIG. 7). Slot 92 is preferably arcuate in shape, and is of a design such that when housing 12 is pivoted about pivot pin 84, angle locking means 96 will move freely within slot 92. The purpose of pivot saddle 80 and slot 92 will be discussed in more detail below.

Figure 6:
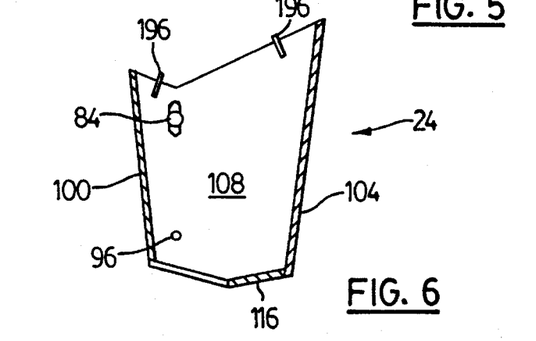
FIG. 6 is a side plan view of a bottom cabinet of a housing used in conjunction with the present invention.

Referring again to FIG. 2, together with FIGS. 6, 7, and 8, bottom portion 20 of housing 12 is sized and shaped to hold projector 48. Preferably, bottom portion 20 is generally rectangular in cross-section, and has securing means for holding projector 48 securely in place (not shown). The securing means may be of any design generally known in the art. For example, securing means may be brackets or clamps designed to secure projector 48 to bottom portion 20 of housing 12. Bottom portion 20 of housing 12 has front panel 100, rear panel 104, side panels 108 and bottom panel 116.

Each of side panels 108 may have a V-shaped notch cut out of its top, as best seen in FIG. 6. This notch is designed to accommodate top portion 24 of housing 12, as will be later discussed herein.

Air inlets 120 may be provided to aid in cooling projector 48. In the preferred embodiment, a plurality of air inlets 120 are provided in front panel 100 of bottom portion 20. Air inlets 120 may be of any shape which provides cooling to projector 48. In one embodiment, air inlets 120 are elongate in shape.

Rear panel 104 may have an access door 124 which is provided to give easy access to projector 48 for servicing and the like. Access door 124 may be of any design, for instance a cut out portion of rear panel 104 which is held in place with screws. Alternatively, access door 124 may be hinged with respect to rear panel 104, and held in the closed position by one or more latches 128. In the preferred embodiment, latches 128 are Southco Flush Pull Latches and are located at the top of access door 124. In this embodiment, access door 124 is held in place at the bottom by securing pins 132, 136.

Side panels 108 each have pivot pin 84 adapted to fit in pivot saddle 80, to allow bottom portion 20 of housing 12 to pivot in relation to base 16. Pivot pin 84 may be best seen in FIG. 9. Pivot pin 84 is preferably in a location along the longitudinal axis of side panels 108, 112 which allows bottom and top portions 20, 24 to be properly balanced when pivot pin 84 rests in pivot saddle 80. Further, pivot pin 84 is preferably located near the top of bottom portion 20 of housing 12 such that the majority of the weight of bottom portion 20 of housing 12 is located beneath pivot pin 84 when resting in pivot saddle 80.

Figure 9:
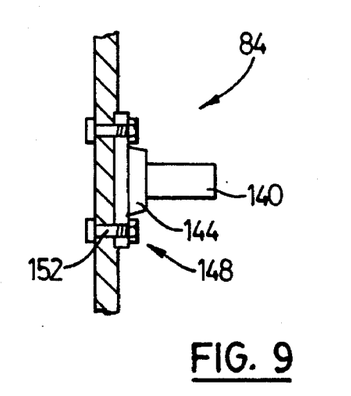
FIG. 9 is a side plan view of a pivot pin used with the display apparatus.

Pivot pin 84 may be mounted to bottom portion 20 in any known manner. In a preferred embodiment, pivot pin 84 comprises pivot rod 140 and mounting plate 144. Pivot rod 140 is preferably cylindrical in shape, and may be integrally formed with mounting plate 144, or may be separately attachable, for example, with pivot rod 140 and mounting plate 144 being matedly threaded. In a preferred embodiment, pivot rod 140 and mounting plate 144 are integrally formed. Mounting plate 144 has mounting holes 148 adapted to receive mounting bolts 152. Mounting bolts 152 extend through mounting holes 148 and the respective side panel 108 of bottom portion 20, and are used to attached mounting plate 144 to side panels 108. Preferably, mounting plate 144 is slightly countersunk into its respective side panel 108 in order to give more support to pivot rod 140.

Angle locking means 96 is adapted to be received by slot 92 and is provided to lock bottom portion 20 and top portion 24 at a predetermined angle with respect to base 16. As best seen in FIG. 2, angle locking means 96 may comprise locking bolt 156 which is secured to bottom portion 20 in any known manner, and extends through slot 92. The exposed end of bolt 156 is externally threaded and is adapted to receive internally threaded nut or knob 160.

As will be appreciated, when bottom portion 20 of housing 12 is resting on base 16 by means of pivot pin 84, the user may adjust bottom portion 20 to the desired angle in relation to base 16, and then lock bottom portion 20 in place by tightening knob 160 on bolt 156. In this manner, bottom portion 20 is held in place by pinching base 16 between knob 160 and side panel 108 of bottom portion 20. The extent to which bottom portion 20 will pivot in relation to base 16 in either direction is determined by the length of slot 92. Because bottom portion 20 and top portion 24 are secured together, by pivoting bottom portion 20 about pivot pin 84, the viewing angle of display screen 14 may be adjusted to suit the individual user of the apparatus.

Referring again to FIG. 2, top portion 24 of housing 12 is removably secured to bottom portion 20 of housing 12, and is of a design and size appropriate to accommodate display screen 14 and screen support 68, together with internally holding reflection means 52. In a preferred embodiment, top portion 24 has face 164, upper side 168, lower side 172, rear side 176, end walls 180, and projection side 188 which together form cavity 192.

In the preferred embodiment, the angle formed between lower side 172 and projection side 188 is the same as the angle of the cut out provided in the top of side panels 108 of bottom portion 20 of housing 12. By this design, top portion 24 may rest stably on bottom portion 20. In addition, top and bottom portions 24, 20 may be attached by means of latches 196. In a preferred embodiment, top and bottom portions 24, 20 are attached with Southco Overcentre Latches (as can be seen in FIG. 6).

Top portion 24 has mirrors 56 and 60 attached to the interior surface of upper side 168 and lower side 172 respectively. The mirrors 56 and 60 may be attached in any known manner, for example with mirror clamps (not shown). Preferably, mirrors 56 and 60 are easily adjustable by means of mirror adjustment means 200 (shown only on mirror 56, for clarity). Projector 48, mirrors 56 and 60 and display screen 14 are set at relative angles such that an image from projector 48 is reflected off of mirror 56 onto mirror 60, and subsequently from mirror 60 onto display screen 14.

Face 164 preferably comprises a fixed section 204 and a hinged section 208 hinged thereto by means of hinges 212. Preferably, hinged section 208 includes display screen 14 and screen support 68 located therein. Hinged section 208 is provided to allow easy access to cavity 192. This allows the user to easily clean, as well as make any necessary adjustments to, mirrors 56 and 60. Hinged section 208 may also include latching means 216 to secure it to lower side 172 when it is in the closed position. Latching means 216 may comprise any known means, for example, an ordinary latch 220. In a preferred embodiment, latch 220 is a Southco Grabber Door Catch. Preferably, hinged section 208 of face 164 extends slightly beyond the upper edge of lower side 172, thereby creating lip 224. This allows the user to easily open hinged section 208 by releasing latch 220, grasping lip 224 and lifting upwardly.

To allow further access to the interior of top portion 24, upper side 168 may also be hinged to face 164, and in particular, fixed section 204. This may be accomplished in a manner similar to the manner in which hinged section 208 is hinged to fixed section 204 of face 164, and may include a similar latching means.

Hinged section 208 is designed to accommodate display screen 14, and screen support 68. Screen support 68 and display screen 14 may be secured in hinged section 208 by any known means. Preferably, screen support 68 and display screen 14 are countersunk into hinged section 208, such that the top surface of display screen 14 is flush with hinged section 208. In addition, a moulding (not shown) which covers the joint between hinged section 208 and display screen 14 may be provided. The moulding keeps display screen 14 and screen support 68 from becoming dislodged from hinged section 208. Further, it will prevent display screen 14 from becoming separated from screen support 68 at its edge, as the edge of display screen 14 and screen support 68 is unexposed.

End walls 180 of top portion 24 of housing 12 may contain handles 228 which allow the user to easily adjust the angle of top portion 24 and bottom portion 20 of housing 12 in relation to base 16. In the preferred embodiment, two handles 228 are provided on each end wall 180. In this manner, handles 228 may be used not only to adjust the tilt of top and bottom portions 24, 20 of housing 12, but can also be used to lift and move the entire apparatus.

A cooling fan 232 may be provided to provide air circulation into cavity 192 to prevent overheating of projection means 44. Preferably, fan 232 is located within cavity 192 and is mounted on rear side 176, such that it draws air from the outside through opening 236. In the preferred embodiment, fan 232 is a Papst model 5606 S fan.

In order to ensure that clean air is circulated within cavity 192, a filter 240 may be provided in opening 236. In the preferred embodiment, filter 240 is a Papst LZ 40/60 screen filter, and is countersunk into rear side 176, so as be flush with its surface.

In the two mirror embodiment of the apparatus, smaller mirror 56 is located on the interior surface of upper side 168, and larger mirror 60 is located on the interior surface of lower side 172. Smaller and larger mirrors 56, 60 may be attached by any known means. As stated previously, the means of fastening small and large mirrors preferably includes mirror adjustment means 200 for making any necessary minor adjustments to the angles or position of the mirrors. Adjustment means 200 may, for example, comprise four adjustment screws 244, with one screw located at each of the four corners of each mirror. Adjustment of the mirrors 56, 60 may then be accomplished by individually adjusting each adjustment screw.

In order to provide better stability for mirrors 56, 60, they may be mounted on a backing 248, which is in turn attached to the top portion 24 of housing 12. In a preferred embodiment, mirrors 56, 60 are mounted onto 0.25 inch plywood, which is in turn attached to top portion 24 of housing 12.

As best seen in FIG. 2, projector 48 is mounted within bottom portion 20 in a substantially vertical fashion, so that it projects images onto smaller mirror 56. Projector 48 may be mounted in any convenient fashion, provided that it is stable and will not vibrate during normal use. This is important so that the image projected onto display screen 14 will be steady and will not vibrate.

In this design, an aperture 252 is provided in projection side 188 of top portion 24 of housing 12, to allow projected images to be displayed on display screen 14. In a preferred embodiment, a series of apertures 252 are provided, one for each of the red, green and blue lenses of projector 48.

A feature of the design of the housing 12 used with the present invention is the ability to easily dismantle the apparatus for transportation. As will be appreciated, top and bottom portions 24, 20 of housing 12 are easily unattached from each other by releasing latches 196. Further, bottom portion 20 is detachable from base 16 by simply removing knob 160 from angle locking means 96. When these portions of housing 12 are detached, display screen 14 and reflection means 52 remain in top portion 24, and projector 48 remains in bottom portion 20 of housing 12. Thus, the design allows for safe and easy transportation of the display screen 14, screen support 68, reflection means 52 and projector 48 by transporting such within the individual components of housing 12.

In use, the apparatus of the present invention may be utilized in conjunction with a computer graphics design program, run by a computer. Typically, the computer used with the apparatus will be located outside of the housing 12, for instance on the floor next to the apparatus, or on a nearby desk. Alternatively, the computer may be located within housing 12. The computer is connected with the light pen or other signalling means, and is also connected with the projection means. In such an application, the user points the light pen at a location on the display screen of the apparatus. This location is then registered by the computer through the projection means. The computer may then proceed with a particular application based on the location where the light pen is detected. Alternatively, a computer graphics application may be utilized in conjunction with the apparatus. In this case, the light pen may be moved across the display screen. As this is done, the computer registers its movement, and sends an image to the display screen which corresponds with the light pen's movement. By this design, the computer will generate an image on the display screen which corresponds with the pattern drawn on the display screen by the user with the light pen.

It will be appreciated that by use of the present invention, the location to which the user points the light pen on the screen and the location which the computer program detects the light pen are almost exactly the same point, and parallax error is virtually eliminated. This is in contrast to traditional devices in which the location registered by the computer program and the location which the light pen is directed do not correspond.

Each user of the apparatus may adjust the viewing angle of display screen 14 to suit his or her individual preference. This is accomplished by releasing angle locking means 96 by rotating knob 160 in the direction required to loosen it from base 16. When this occurs, housing 12 will be free to pivot about pivot pin 84, until the desired angle of display screen 14 is achieved. Knob 160 may then be tightened again, thereby locking housing 12 in place relative to base 16.

The user may then proceed to use the display apparatus with a light pen or other signalling means designed to be detected on display screen 14 by the computer program, as described above.

Ideally, the display apparatus is of a size that the user may stand or sit at and work comfortably, for example, the size of a desk.

Figure 10:
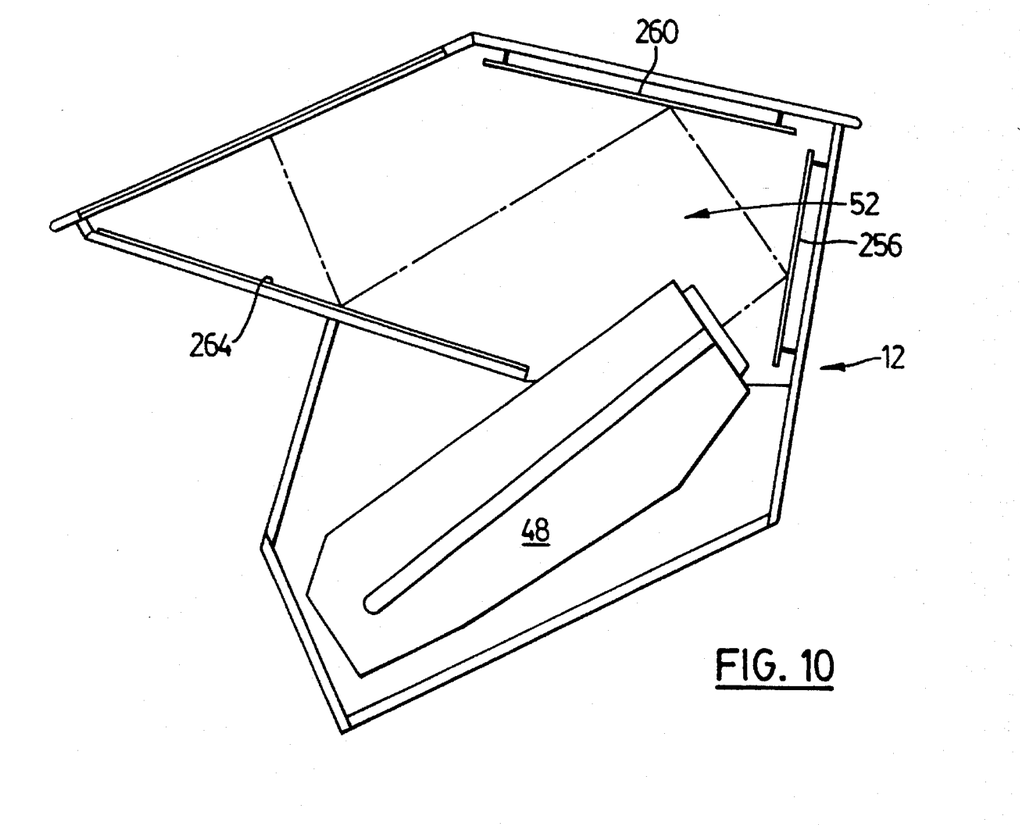
FIG. 10 is a side plan view of the housing of an alternative embodiment of the present invention, with one side removed.

Referring now to FIG. 10, in an alternative embodiment, reflection means 52 may comprise a three mirror configuration, rather than a two mirror configuration. In this embodiment, three mirrors 256, 260 and 264 are utilized to reflect images projected from projector 48 onto display screen 14. As can be seen, the mirrors in this embodiment are again arranged in such a fashion that images projected from projector 48 are reflected from mirror 256 onto mirror 260, from mirror 260, onto mirror 264, and subsequently from mirror 264 onto display screen 14. As will be appreciated, any number of mirrors may be utilized. As the number of mirrors utilized increases, a correspondingly shorter distance from projector 48 to display screen 14 is needed to display an image of any given size.

Figure 11:
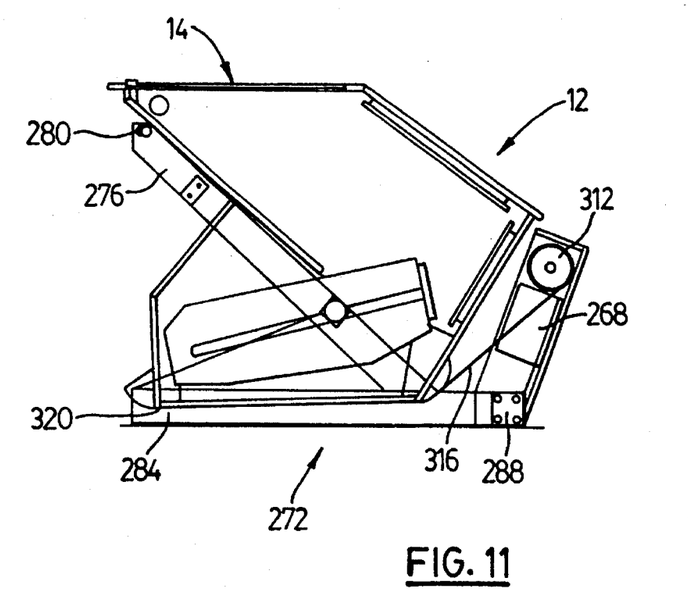
FIG. 11 is a side plan view of an alternative embodiment of the present invention, in which a motor is utilized to pivot the housing with respect to the base, with the housing fully pivoted in one direction.
Figure 12:
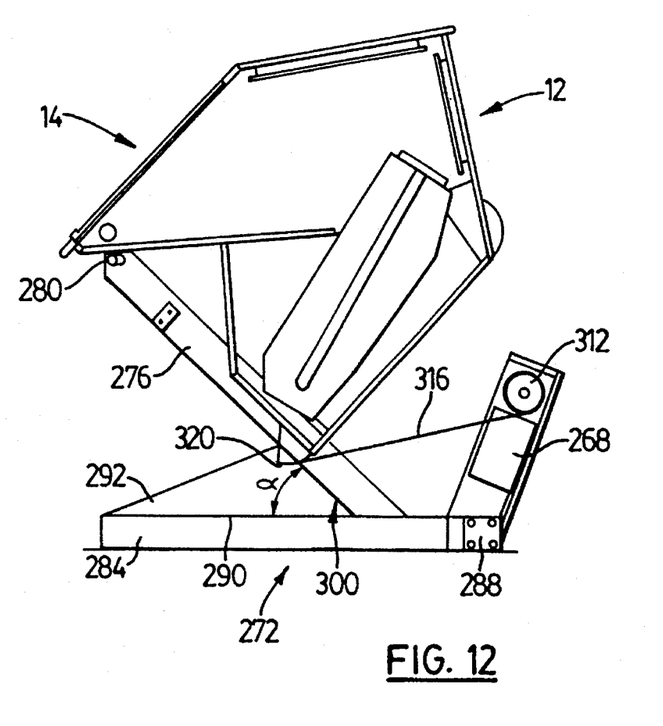
FIG. 12 is a side plan view of the alternative embodiment of the present invention, in which the housing is fully pivoted in the opposite direction with respect to FIG. 11.

A further alternative embodiment of the present invention is shown in FIGS. 11 and 12, where housing 12 is provided with a motor 268 to aid the user in adjusting the viewing angle of display screen 14. In this embodiment, base 16 may comprise a bottom frame 272, side rails 276, and pivot shaft 280.

Bottom frame 272 may be of any design which rests on the floor or other surface on which the display apparatus resides, and supports side rails 276 and housing 12. In a preferred embodiment, bottom frame 272 has two parallel side members 284 and a cross member 288 extending therebetween. In one embodiment, cross member 288 is located at one end of side members 284 and extending therebetween at a perpendicular angle.

Side rails 276 extend upwardly from side members 284 and away from cross member 288, and preferably a 45 degree angle α is formed between the side members 284 and side rails 276. Bottom frame 272 and side rails 276 are made from a sturdy material such as steel. Braces 292 may be provided to help support side rails 276. Braces 292 may be triangular in shape, and act as wedges within angle α, with a first side 296 extending along side members 284, and a second side 300 extending along side rails 276.

Pivot shaft 280 is located at the upper end of side rails 276 and extends therebetween. Pivot shaft 280 is preferably cylindrical, and is of a design which allows housing 12 to pivot about it.

A shaft receiving member (not shown) is attached to housing 12, and is adapted to receive pivot shaft 280. the shaft receiving member 304 may be tubular in nature, and contain a hollow portion adapted to accommodate pivot shaft 280. Shaft receiving member 304 may be attached to housing 12 by any known design.

Cross member 288 has motor 268 attached thereto, extending generally upwardly and rearwardly from cross member 288. Motor 268 may comprise any known motor design, such as an electrically driven motor. Motor 268 is operably connected to a winding spool 312 so that, when activated by motor 268, winding spool 312 rotates about an axis parallel to the axis of rotation of housing 12.

A winding tape 316 is attached to the forward end 320 of the bottom of housing 12. At its other end, winding tape 316 is attached to winding spool 312. Winding tape 312 is made from a strong material, preferably stainless steel. Alternatively, a pair of winding spools 312 and winding tapes 316 may be provided, each in the configuration already described herein.

When activated, motor 268 operates to rotate winding spool 312, which takes up winding tape 316 thereon. Winding tape 316 in turn pulls the forward end 320 of housing 12 towards winding spool 312. This causes housing 12 to pivot about pivot shaft 280 in a counterclockwise direction, as viewed in FIGS. 11 and 12. As a result, display screen 14 is rotated into a position where it is in a more vertical position relative to the user, as seen in FIG. 12. When motor 268 is deactivated, rotation of winding spool 312 stops, and housing 12 is held at the desired angle in relation to the user. By providing a motor 268 which is reversible in direction of operation, housing 12 may be pivoted in either direction about pivot shaft 280. When motor 268 is reversed in direction, winding spool 312 rotates in a direction so that winding tape 316 is payed out therefrom. Because the housing 12 is substantial in weight, as winding tape 316 is payed out from winding spool 312, housing 12 pivots about pivot shaft 280 in a clockwise direction (as viewed in FIGS. 11 and 12) due to the forces of gravity. In this position, display screen 14 is in a more horizontal position relative to the user. As will be appreciated, the extent to which housing 12 may pivot about pivot shaft 280 may be limited by varying the length of winding tape 316. In one embodiment, winding tape 316 is of a length which that display screen 14 may move between a substantially vertical position relative to the user (as seen in FIG. 12) and a substantially horizontal position relative to the user (as seen in FIG. 11).

It should be appreciated that various changes may be made to the preferred and alternative embodiments described herein, without departing from the subject invention, the scope of which is defined in the appended claims.

I claim:

1. A rear projection display apparatus for displaying images drawn by a user with an interactive writing device such as a light pen, comprising:

(a) a housing having a working area;

(b) projection means mounted in the housing for receiving signals correlatable with the position of the writing device and projecting and for focusing images corresponding therewith in a predetermined focal plane;

(c) support means mounted in said housing for supporting the working area during the use of the interactive writing device, said support means comprising a transparent screen support having a bottom surface and a top surface, said bottom surface being the surface which light emitted from said projection means first contacts when passing through said screen support, said top surface being the surface which light emitted from said projection means last contacts when passing through said screen support, said top surface being substantially flat; and (d) display means removably adhereable to said top surface of said screen support for diffusing and displaying the images projected by said projection means wherein the thickness of said display means is preselected to reduce parallax error.

2. The display apparatus as claimed in claim 1, wherein said display means comprises a translucent display screen.

3. The display apparatus as claimed in claim 1, wherein said display screen is removably adhered to said screen support by a spray adhesive.

4. The display apparatus as claimed in claim 1, wherein said display screen is made from mylar.

5. The display apparatus as claimed in claim 1, wherein said display screen is of a thickness between 0.002 and 0.005 inches.

6. The display apparatus as claimed in claim 1, wherein said display screen is of a thickness of about 0.003 inches.

7. The display apparatus as claimed in claim 1, wherein said screen support is transparent glass.

8. The display apparatus as claimed in claim 7, wherein said screen support is about 0.25 inches in thickness.

9. The display apparatus as claimed in claim 1, wherein said projection means comprises a projector and reflection means for reflecting the image, said reflection means adapted to reduce the linear distance between said projector and said display means without decreasing the size of the image on said display means, and without changing the focal length of the projected image.

10. The display apparatus as claimed in claim 9, wherein said reflection means comprises one or more mirrors, said mirrors located within said housing, said mirrors arranged to sequentially reflect the image from said projector means on to said display means.

11. The display apparatus as claimed in claim 10, wherein said reflection means comprises a first mirror and a second mirror, said first mirror being the mirror which the image projected from said projector means first contacts and is reflected on to said second mirror, said second mirror subsequently reflecting the image on to said display means.

12. The display apparatus as claimed in claim 11, wherein said first mirror has a smaller reflecting area than said second mirror.

13. The display apparatus as claimed in claim 10, wherein said reflection means comprises a first mirror, a second mirror and a third mirror, said mirrors arranged to sequentially reflect the image from said projector means onto said display means.

14. The display apparatus as claimed in claim 13, wherein said first mirror has a smaller surface area than said second mirror, and said second mirror has a smaller reflecting area than said third mirror.

15. The display apparatus as claimed in claim 1, additionally comprising a base, and pivot means for pivotally mounting said housing on said base to pivot about an axis.

16. The apparatus as claimed in claim 15, wherein said pivot means comprises a pivot saddle and an arcuate slot located on said base, and a pivot pin and locking means to lock said housing at a desired angle with respect to said base section, said pivot pin adapted to be received by said pivot saddle, and said locking means adapted to associate with said slot, whereby said housing is supported on said base by said pivot pin and may be pivoted about said pivot pin and locked at a desired angle in relation to said base.

17. The apparatus as claimed in claim 16, wherein said housing additionally comprises a top portion and a bottom portion, said top and bottom portions being releasably attached to each other.

18. The display apparatus as claimed in claim 17, wherein said top portion houses said reflection means and said bottom portion houses said projector.

19. The display apparatus as claimed in claim 18, wherein said reflection means comprises a smaller mirror and a larger mirror.

20. The display apparatus as claimed in claim 19, wherein said top portion comprises a face, and upper and lower sides, said face adapted to hold said display means, said smaller mirror mounted on the interior surface of said upper side, said larger mirror mounted on the interior surface of said lower side, such that the image projected from said projector means on to said smaller mirror is reflected on to said larger mirror and is subsequently reflected on to said display means.

21. The display apparatus as claimed in claim 20, wherein said smaller mirror and said larger mirror are adjustably mounted to the interior surfaces of said upper side and lower side respectively.

22. The display apparatus as claimed in claim 21, wherein said face has a fixed portion and a hinged portion, said hinged portion being hinged to said fixed portion, and said hinged portion holding said display means.

23. The display apparatus as claimed in claim 19, wherein said base is generally of an inverted T-shape.

24. The display apparatus as claimed in claim 17, wherein said housing has a plurality of air inlets to provide cooling and air circulation to said projector.

25. The display apparatus as claimed in claim 24, wherein said air inlets are located in said bottom portion of said housing.

26. The display apparatus as claimed in claim 17, wherein a cooling fan is provided in said housing to provide cooling and air circulation to said projection means.

27. The display apparatus as claimed in claim 26, wherein said cooling fan is located in said top portion of said housing.

28. The display apparatus as claimed in claim 15, wherein said pivot means comprises a pivot shaft mounted to said base, a shaft receiving member mounted adjacent said upper portion and a motor mounted adjacent said base, said pivot shaft being mounted transverse to the direction of said axis, said shaft receiving member having a hollow portion located therein for receiving said pivot shaft, said motor being operably connected to said upper portion by a winding spool and winding tape, said winding tape extending between said winding spool and said upper portion of said housing, whereby when said motor is activated, said winding spool rotates and winds said winding tape thereon, thereby causing said upper portion to pivot about said pivot shaft.

* * * * *